United States Patent Office.

JOSEF ZIEGLER, OF BIEBRICH, GERMANY, ASSIGNOR TO ADOLF LEMBACH AND ULRICH SCHLEICHER, OF SAME PLACE, AND C. J. WOLFF, OF WIESBADEN, GERMANY.

QUINOLIN COMPOUND.

SPECIFICATION forming part of Letters Patent No. 497,740, dated May 16, 1893.

Application filed June 22, 1892. Serial No. 437,558. (Specimens.)

*To all whom it may concern:*

Be it known that I, JOSEF ZIEGLER, residing in Biebrich-on-the-Rhine, in the Kingdom of Prussia and Empire of Germany, have invented certain new and useful Improvements in Processes of Manufacturing Oxyquinolin-Phenol Sulfonate of Oxyquinolin, of which the following in a specification.

This invention relates to an improved process of manufacturing oxyquinolin phenol sulfonate of oxyquinolin, which is a water-soluble disinfectant of high antiseptic properties.

This substance is obtained by digesting one molecule of phenol, two molecules of oxyquinolin, and one molecule of sulphuric acid, with or without water, at medium temperature, until the chemical union of these ingredients is accomplished.

In carrying out my improved process, ten kilograms of oxyquinolin are melted and mixed at a temperature below 100° centigrade with 3.25 kilograms of phenol. A chemical reaction and increase of temperature take place, during which the mass assumes a yellow color. To the so-obtained oxyquinolin-phenolate, which still contains one molecule of oxyquinolin in solution, is added a mixture of 3.400 kilograms of concentrated English sulphuric acid, of 66° Baumé, and 1.240 kilograms of water, under continuous stirring, while the solution is at the same time subjected to a temperature of from 90° to 100° centigrade. As soon as all the acid is added, the resultant mass is poured, while it is still in a warm and liquid state, into shallow vessels which are held in readiness for that purpose. On the cooling of the mass of oxyquinolin phenol sulfonate of oxyquinolin, the same is dissolved in water and is crystallized from the same. In its pure state, it forms amber-colored hexagonal crystals, which, when pulverized, yield a powder of a light yellow color, which melts at 84° centigrade, is easily soluble in water, has a weak phenol and saffron-like character and when dissolved in water an agreeable and refreshing flavor.

When the oxyquinolin phenol sulphate of oxyquinolin is mixed with iron-chloride, it produces a color-reaction in shades varying from green to bluish-green. When a diluted and slightly heated solution of the same is mixed with soda solution in excess, it precipitates oxyquinolin, which can be readily filtered off, while phenol remains in the solution. From the filtrate phenol is readily liberated by diluted sulphuric acid, and, when absorbed by ether, can be readily determined.

The oxyquinolin phenol sulfonate of oxyquinolin has, as is proven by practical tests, high antiseptic properties. A solution containing 0.1 per cent. of this substance destroys Koch's cholera bacillæ in less than ten minutes. The diphtheria and other pathogenic bacteria are likewise killed in less than ten minutes by solutions containing 0.2 per cent. of this substance.

The oxyquinolin phenol sulfonate of oxyquinolin has the following empirical formula:

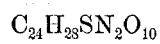

$$C_{24}H_{23}SN_2O_{10}$$

and the following synthetical formula:

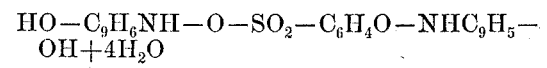

$$HO-C_9H_6NH-O-SO_2-C_6H_4O-NHC_9H_5-OH+4H_2O$$

or, when arranged in its component groups:

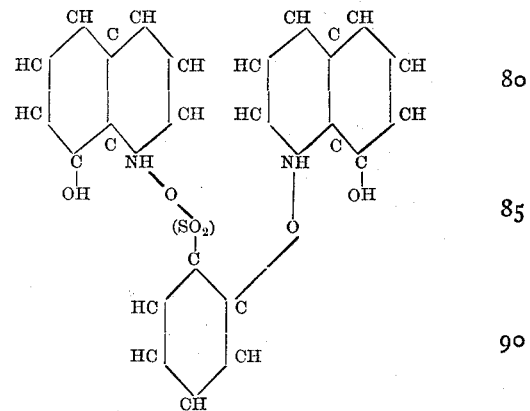

From the last formula it appears that the new antiseptic substance contains in each molecule two atoms of pyridine-nitrogen and three hydroxyl groups; in other words, five groups, all of which possess antiseptic properties.

The difference between the substance described in the present application and the phenol sulfonate of oxyquinolin described in my prior patent No. 466,707, dated January 5, 1892, consists mainly in the employment of two molecules of oxyquinolin for one molecule of phenol and one molecule of sulphuric acid, while in the patent referred to one molecule of oxyquinolin was employed for one molecule of phenol and one molecule of sulphuric acid. The empirical formula of the substance described in my former patent is $$C_{15}H_{13}SNO_5$$

and the synthetical formula is as follows:

$$HO-C_9H_6NH-O-(SO_2)-C_6H_4-OH$$

or arranged in its component groups:

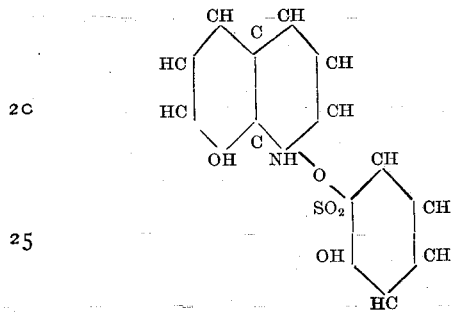

It appears thus by a comparison of the two groups, that a second molecule of oxyquinolin is introduced into the hydroxyl group of the phenol-sulfonic acid. The new substance differs thus not only from the substance described in Letters Patent No. 466,707, by the difference in preparing the same, but also by its chemical constitution and its physical properties, it having a much more anti-bacterial effect and no irritating and poisonous properties.

Having thus described my invention, I claim as new, and desire to secure by Letters Patents—

1. The process herein described of making oxyquinolin phenol of sulfonate of oxyquinolin, which consists in digesting phenol and oxyquinolin with sulphuric acid until the chemical reaction of the component parts takes place, substantially as set forth.

2. The process herein described of making oxyquinolin phenol sulfonate of oxyquinolin, which consists in digesting a mixture of phenol, oxyquinolin and sulphuric acid until the chemical reaction takes place, then treating the so obtained oxyquinolin-phenolote with a solution of sulphuric acid in water at a temperature near the boiling point, substantially as set forth.

3. The new antiseptic herein described, namely oxyquinolin phenol sulfonate of oxyquinolin, being water-soluble, forming amber-colored hexagonal crystals and producing with iron-chlorid a color-reaction in shades varying from green to bluish-green, substantially as set forth.

In witness whereof I hereunto set my hand in presence of two witnesses.

JOSEF ZIEGLER.

Witnesses:
ALVESTO S. HOGUE,
JEAN GRUND.